US008550476B1

(12) United States Patent
Whinnery

(10) Patent No.: US 8,550,476 B1
(45) Date of Patent: Oct. 8, 2013

(54) DUAL DIRECTIONAL HAND TRUCK

(76) Inventor: Norman A. Whinnery, Gulf Breeze, FL (US)

( * ) Notice: Subject to any disclaimer, the term of this patent is extended or adjusted under 35 U.S.C. 154(b) by 8 days.

(21) Appl. No.: 13/445,970

(22) Filed: Apr. 13, 2012

(51) Int. Cl.
*B62B 1/04* (2006.01)

(52) U.S. Cl.
USPC .................. 280/47.27; 280/47.18; 280/47.29

(58) Field of Classification Search
USPC ............ 280/33.991, 33.992, 33.995, 33.996, 280/33.998, 47.131, 47.17, 47.18, 47.23, 280/47.24, 47.27, 47.28, 47.29, 47.34; 414/490
See application file for complete search history.

(56) References Cited

U.S. PATENT DOCUMENTS

| | | | | |
|---|---|---|---|---|
| 2,148,090 | A * | 2/1939 | Turner | 280/46 |
| 3,826,512 | A * | 7/1974 | Palmer | 280/43.12 |
| 4,915,408 | A * | 4/1990 | Clemence et al. | 280/655 |
| 5,738,480 | A * | 4/1998 | Butzen | 414/490 |
| 5,826,893 | A * | 10/1998 | Snoeyenbos | 280/43 |
| 5,924,832 | A * | 7/1999 | Rice | 414/23 |
| 6,059,512 | A * | 5/2000 | Kielinski | 414/490 |
| 6,062,802 | A * | 5/2000 | Aenchbacher | 414/490 |
| 6,361,057 | B1 * | 3/2002 | Carter | 280/63 |
| 6,386,560 | B2 * | 5/2002 | Calender | 280/47.34 |
| 6,682,084 | B2 * | 1/2004 | Webster et al. | 280/79.5 |
| 6,851,685 | B2 * | 2/2005 | Koenig | 280/47.27 |
| 7,004,482 | B1 * | 2/2006 | Steffan | 280/47.17 |
| 7,914,017 | B2 * | 3/2011 | Setzer et al. | 280/47.29 |
| 7,934,730 | B2 * | 5/2011 | Francis et al. | 280/47.29 |
| 2002/0140191 | A1 * | 10/2002 | Knowlton | 280/47.29 |
| 2003/0020249 | A1 * | 1/2003 | Webster et al. | 280/43 |
| 2009/0160148 | A1 * | 6/2009 | Francis et al. | 280/47.23 |
| 2011/0276181 | A1 * | 11/2011 | Lamb et al. | 700/275 |
| 2012/0153585 | A1 * | 6/2012 | Ryan et al. | 280/47.18 |

* cited by examiner

*Primary Examiner* — Katy M Ebner
*Assistant Examiner* — Brodie Follman
(74) *Attorney, Agent, or Firm* — J. Nevin Shaffer, Jr. Patent Attorney

(57) ABSTRACT

A hand truck comprised of a frame assembly and a wheel assembly connected by slidable cylinders permitting both vertical and rotational movement between the cylinders. The frame assembly cylinder is mounted at a predetermined angle so that when the cylinder is vertical, the frame is reclined in a load balanced attitude. While in the load balanced attitude, the frame assembly can be raised by any suitable means in relation to the wheel assembly on a surface. Once the frame assembly is at a height great enough to clear the wheels, the wheel assembly can be rotated thus enabling movement parallel to a linier load. Further, when the frame assembly is in the lower position, the two slidable cylinders are locked together to provide use as a conventional hand truck or unlocked and reoriented, thus providing the ability to move a linier load laterally with ample ground clearance.

8 Claims, 9 Drawing Sheets

LOAD IN ELEVATED
POSITION

LOAD ELEVATED AND ROTATED TO ALIGN WITH DIRECTION OF TRAVEL

DUAL DIRECTIONAL HAND TRUCK

BACKGROUND OF THE INVENTION

The hand truck is a commonly used device enabling a person to move heavy objects. The conventional prior art hand truck has fixed wheels and has limited movement. The device and load can be moved only perpendicular to the frame. When space is limited, such as moving through doorways, the conventional hand truck is no help moving linier loads.

Some prior art hand trucks claim multidirectional travel which would enhance the movement of linier loads but they are limited in one or more ways. When the wheels are individually pivoted on a vertical axis they allow movement parallel to the frame however when two or more wheels are in line or tandem they will move in a straight line, not steerable. An additional disadvantage of prior art hand trucks that are capable of multidirectional movement is inadequate ground clearance. When a conventional hand truck is tipped back into position to move the load the typical ground clearance of the load is limited to a few inches. If this same hand truck were to be used to move, as example eight foot long sheet material, in a lateral direction, ground clearance may be inadequate to negotiate over uneven ground or a slight ramp between two floor levels. Inadequate ground clearance would be an even greater problem with sagging linier loads such as boards or lengths of metal.

RELATIVE REFERENCES CITED

| | | |
|---|---|---|
| U.S. Pat. No. 3,666,285 | May 30, 1972 | Firtig |
| U.S. Pat. No. 5,120,072 | Jun. 6, 1972 | Laramie |
| U.S. Pat. No. 4,460,189 | Jul. 17, 1984 | Goff |
| U.S. Pat. No. 4,630,838 | Dec. 23, 1986 | Stockton |
| U.S. Pat. No. 4,726,602 | Feb. 23, 1988 | Sanders |
| U.S. Pat. No. 6,663,120 | Dec. 16, 2003 | Fagerqvist |
| U.S. Pat. No. 7,168,712 | Jan. 30, 2007 | Celli |
| U.S. Pat. No. 7,219,903 | May 22, 2007 | Grooters |
| U.S. Pat. No. 7,464,947 | Dec. 16, 2008 | Cortese |

U.S. Pat. No. 3,666,285 also provides lateral movement with 2 secondary wheels mounted in tandem perpendicular to the primary conventionally mounted wheels. The smaller secondary wheels would not travel well over a rough surface and being mounted in tandem the hand truck is not steerable in the lateral direction.

U.S. Pat. No. 5,120,072 is a hand truck designed for hauling longitudinal loads. It is not dual functional with use as a conventional hand truck.

U.S. Pat. No. 4,460,189 is the invention of a hand truck capable of lateral movement by rotating each of the two wheels independently on a vertical axis. With the two wheels mounted in tandem, the hand truck is not steerable in a lateral direction.

U.S. Pat. No. 4,630,838 is a carrier designed to haul sheet products. It does not have the function of a conventional hand truck. It is not able to slide under panels leaning against a wall.

U.S. Pat. No. 4,726,602 claimed as a hand truck for hauling bulky freight is designed primarily for longitudinal movement. As claimed, small swivel rollers may be added to permit lateral movement. This would be of little value on anything but a smooth surface. Also, ground clearance for a sagging linier load would be inadequate.

U.S. Pat. No. 6,663,120 is a hand truck capable of moving a load sideways. Each of the two wheels can be individually indexed to rotate on a vertical axis, thus enabling sideways movement. With the wheels indexed in a tandem orientation, the hand truck is not steerable. Also, the toe plate remains close to the ground which does not provide adequate ground clearance for a long load that could sag at the ends.

U.S. Pat. No. 7,168,712 claimed as a multi-functional hand truck provides several variations of the conventional hand truck, however all are with longitudinal movement. This device does not provide lateral movement for linier loads.

U.S. Pat. No. 7,219,903 has a pair of wheels mounted as conventional prior art hand trucks. An additional two or more wheels are mounted in tandem with the axis of rotation perpendicular to the first pair of wheels. This additional group of wheels provide lateral movement of the hand truck but it is not steerable in the lateral direction. Also, the load remains close to the ground providing inadequate ground clearance for a long, sagging load.

U.S. Pat. No. 7,464,947 is a hand truck capable of multi-directional movement but it is not steerable in the lateral direction. This device also has a position for rotational movement, but this is a fixed circular movement. It is not steerable except in the conventional forward and backward configuration.

SUMMARY OF THE INVENTION

The objective of this invention is to maintain all the useful functions of the conventional hand truck and make it adaptable to provide the additional function of moving linier loads, as for example, sheet material or lumber, in a direction parallel to the length of the load.

The dual directional hand truck apparatus, according to a preferred embodiment, is designed with a separate frame assembly and a wheel assembly. Mounted to each of these assemblies is a cylinder. The predetermined size of the cylinders is designed to be a slip-fit when assembled together. These two slip-fit cylinders slidably mounted together permits the frame assembly and the load to move up in relation to the wheels. When the frame assembly is lifted, by any suitable means, to a height greater than the height of the wheels, the wheel assembly can be rotated to align the direction of travel parallel to the frame. This configuration allows a linier load, such as sheet material, to pass through a doorway with ample ground clearance.

BRIEF DESCRIPTION OF DRAWINGS

FIG. 2A is a perspective view of the frame assembly.

FIG. 2B is a perspective view of the wheel assembly.

REFERENCE NUMERALS

| | |
|---|---|
| 10 | dual directional hand truck |
| 20 | frame assembly |
| 22 | frame |
| 24 | frame handle |
| 26 | frame assembly cylinder |
| 28 | guide slot |
| 30 | angled mount plate |
| 32 | base plate |
| 34 | wheel assembly |
| 36 | wheel assembly cylinder |
| 36 | abushing sleeve |
| 38 | lift arm |
| 39 | support leg |
| 40 | lift yoke |
| 42 | wheel base |
| 44 | wheel |
| 46 | lift sleeve |
| 48 | bushing ring |
| 50 | axle |
| 52 | link |
| 56 | guide pin |
| 58 | lock plate |
| 60 | release lever |
| 62 | lift arm lock pin |
| 64 | deflector |
| 66 | down lock pin |
| 68 | spring |
| 70 | support arm |
| 72 | support channel |
| 74L | left base extender |
| 74R | right base extender |
| 76 | support leg |
| 78 | guide sleeve mount plate |
| 80 | guide sleeve |
| 82 | hydraulic ram top |
| 84 | hydraulic ram |
| 86 | hydraulic cylinder cap |
| 88 | hydraulic cylinder |
| 90 | pump pedal |
| 92 | release pedal |

DETAILED DESCRIPTION OF A PREFERRED EMBODIMENT

Figure 1:
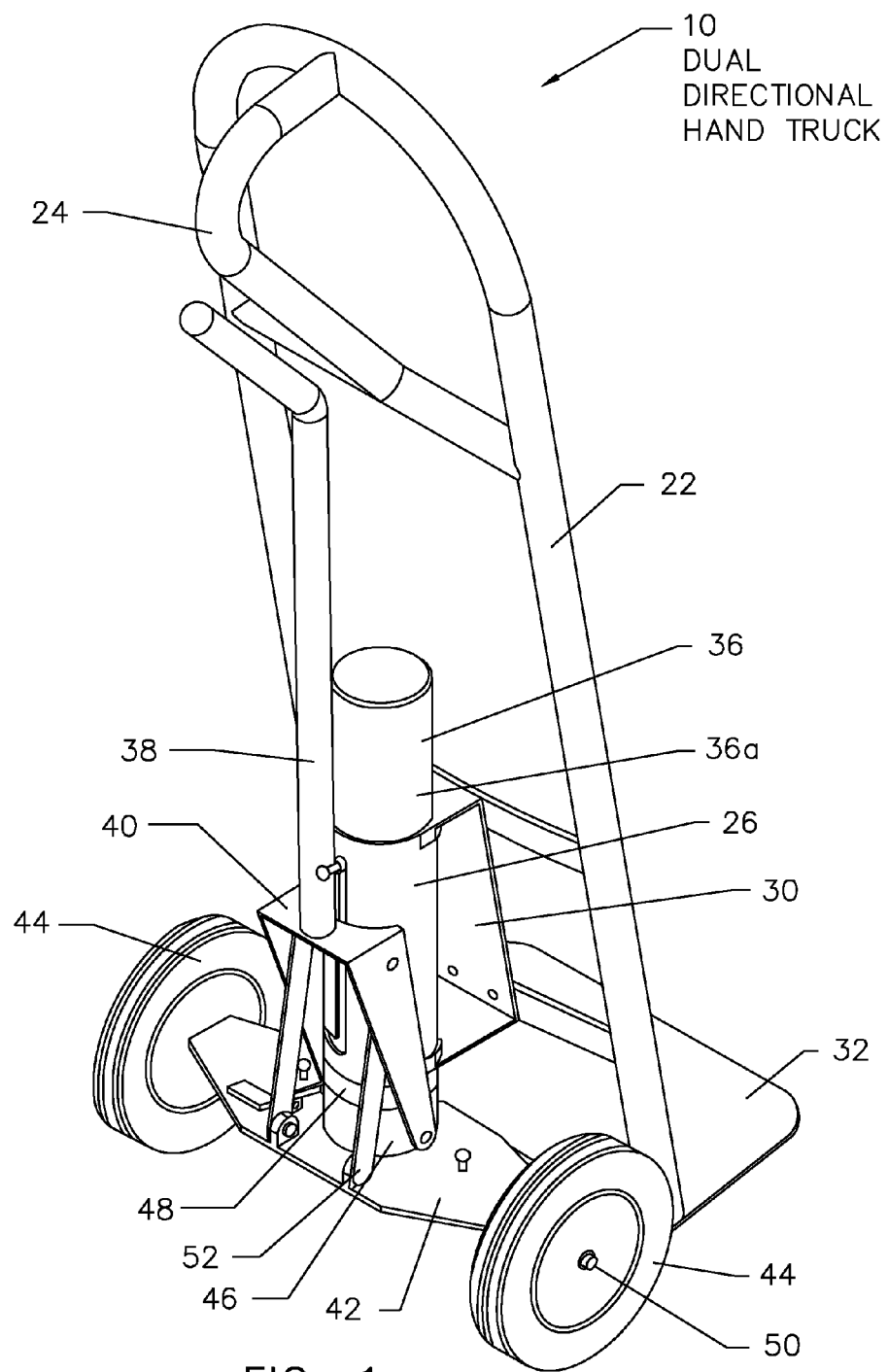
FIG. 1 is a perspective view of a preferred embodiment of the dual directional hand truck of the present invention.

For the purposes of this embodiment, the terms "left", "right", "front", "rear", "top", "bottom" or any derivatives thereof shall relate to FIG. 1 as viewed by the operator in position to move the device. The term "longitudinal" movement shall refer to the direction perpendicular to the front face of frame 22. The term "lateral" shall refer to the direction parallel to the front face of frame 22. Also, for the purposes of this embodiment, the term "linier load" refers to a load, such as several 4'×8' sheets of plywood. The load is not shown in the attached drawings to permit a clearer view of the embodiment of this invention.

Figure 2A:
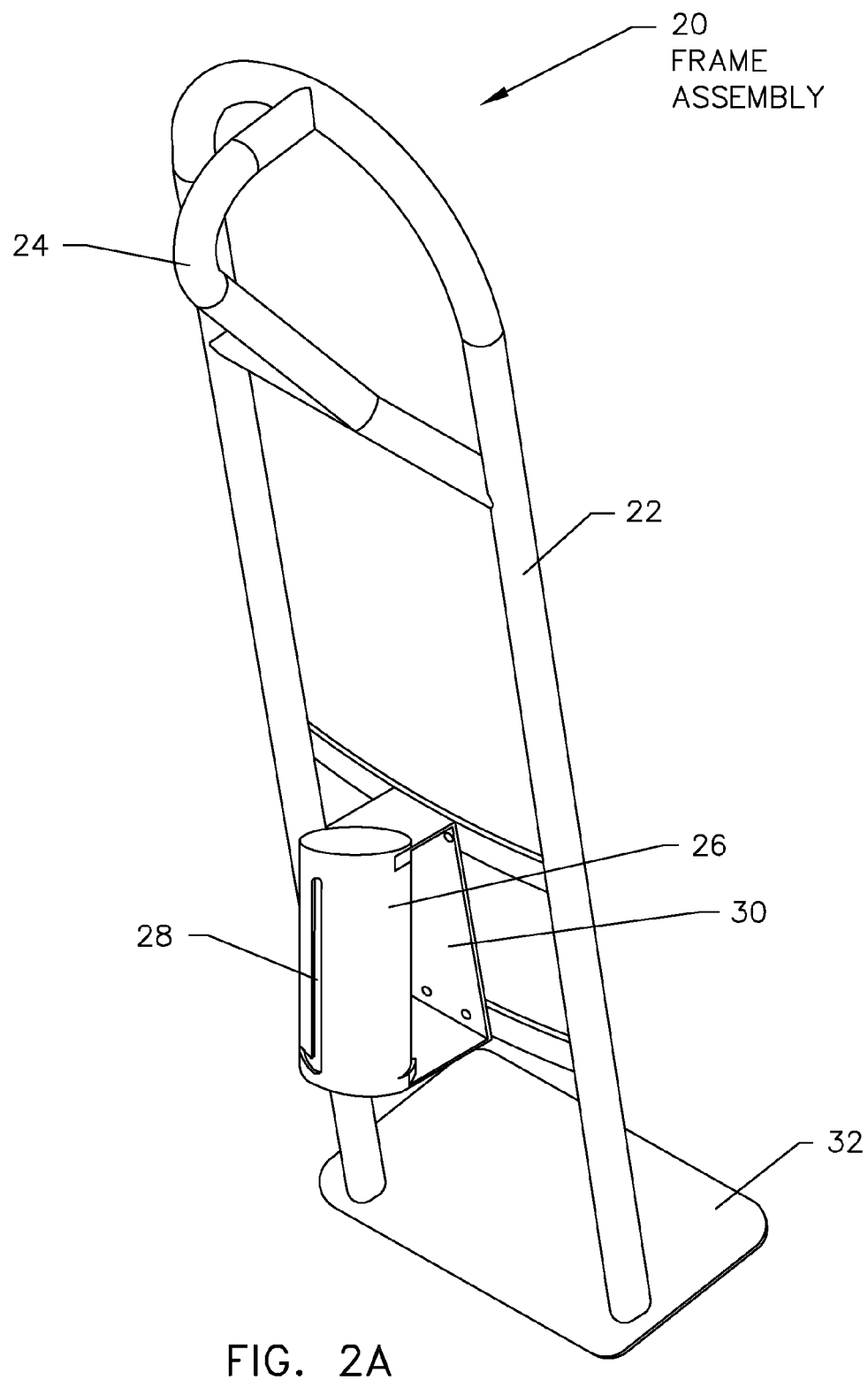
FIGS. 2A and 2B show the two assemblies break down of the invention of FIG. 1.

Shown in FIG. 2A, is a frame assembly 20, consisting of a frame 22 and a base plate 32 mounted together as typical for prior art conventional hand trucks. A frame assembly cylinder 26 which is affixed to an angled mount plate 30 is mounted to the back, lower side of frame 22. The bottom of frame assembly cylinder 26 is tipped away from frame 22 at an angle of approximately 12 degrees.

Figure 2B:
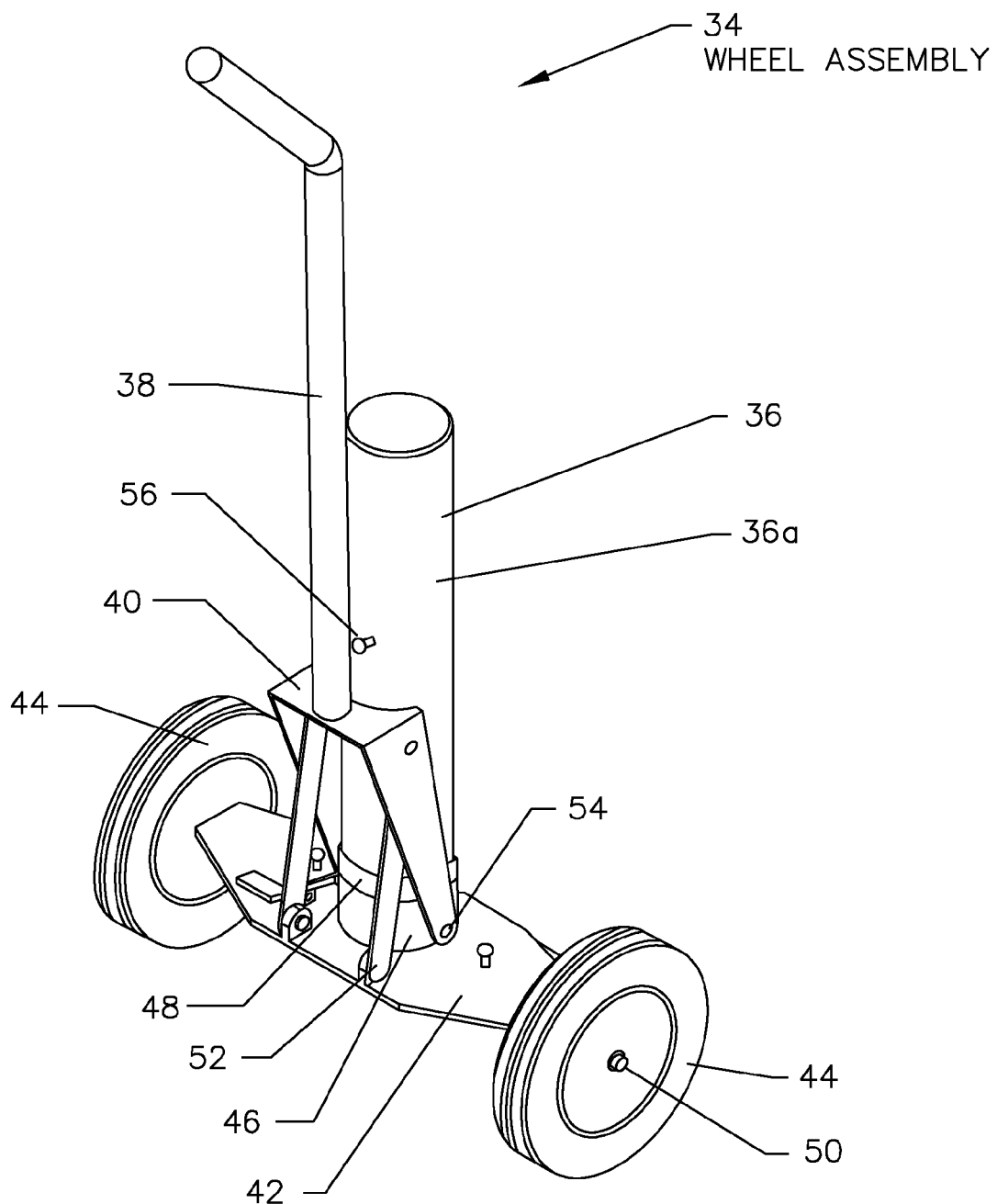

FIG. 2B illustrates a wheel assembly 34, consisting of two wheels 44 on an axle 50 mounted on a wheel base 42 and a wheel assembly cylinder 36. Wheel assembly cylinder 36 is mounted perpendicular to wheel base 42 centered between wheels 44 and centered over axle 50. As optional, the exterior surface of wheel assembly cylinder 36 is bonded with a bushing sleeve 36a, hereafter know as wheel assembly cylinder 36. A lift sleeve 46 has two lift studs 54 extending outward 180° apart. Above lift sleeve 46 is a bushing ring 48 that frame assembly cylinder 26 rests and turns on. A lift arm 38 is affixed to a lift yoke 40. The bottom end of lift yoke 40 attaches to lift studs 54 providing pivotal lift movement to lift studs 54. The top of lift yoke 40 pivots on a link 52 on the left side and on the right side connecting to pivot points on wheel base 42.

Figure 4:
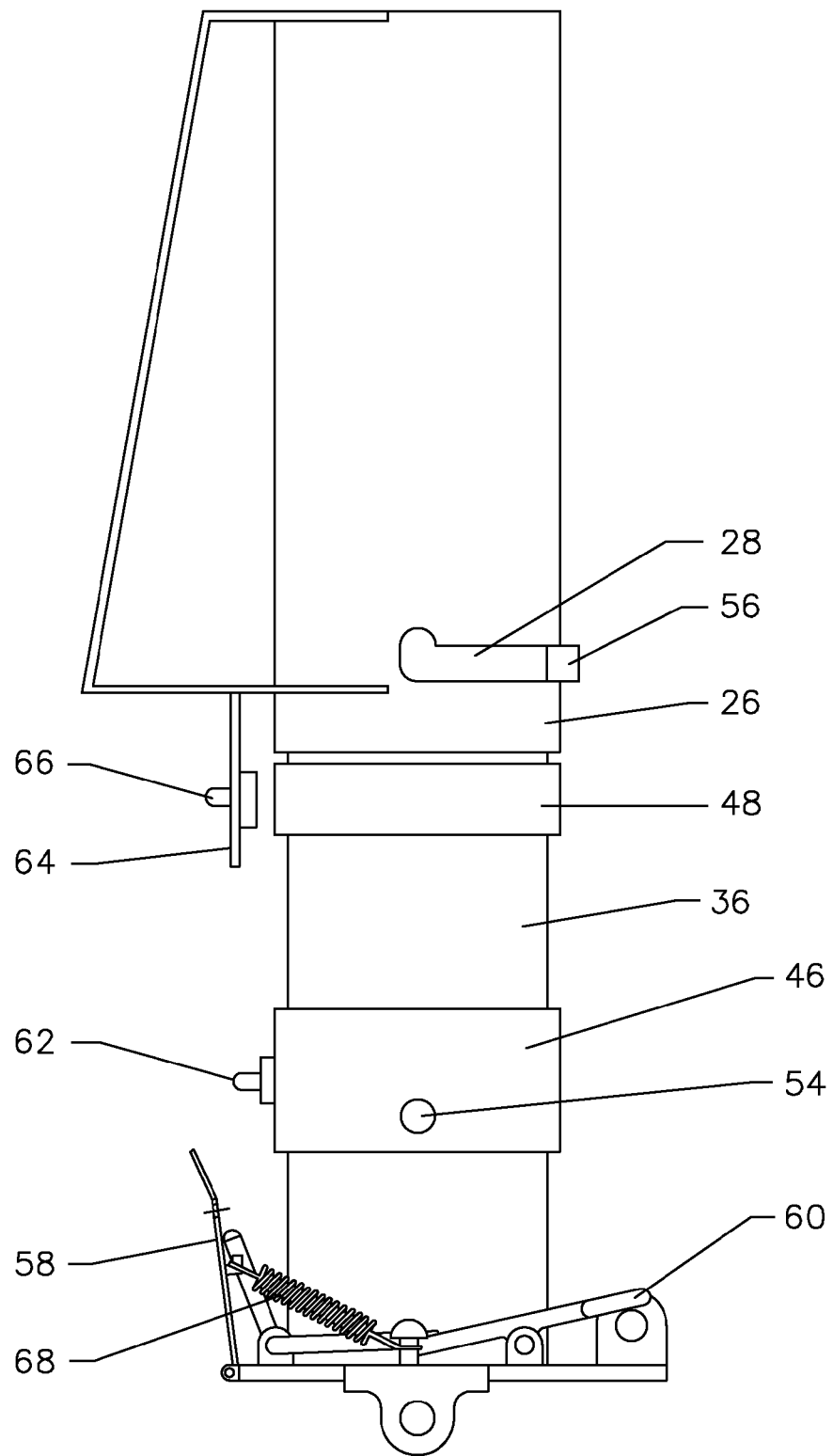
FIG. 4 is a side close up view of the lock system of the invention of FIG. 1.
Figure 5:
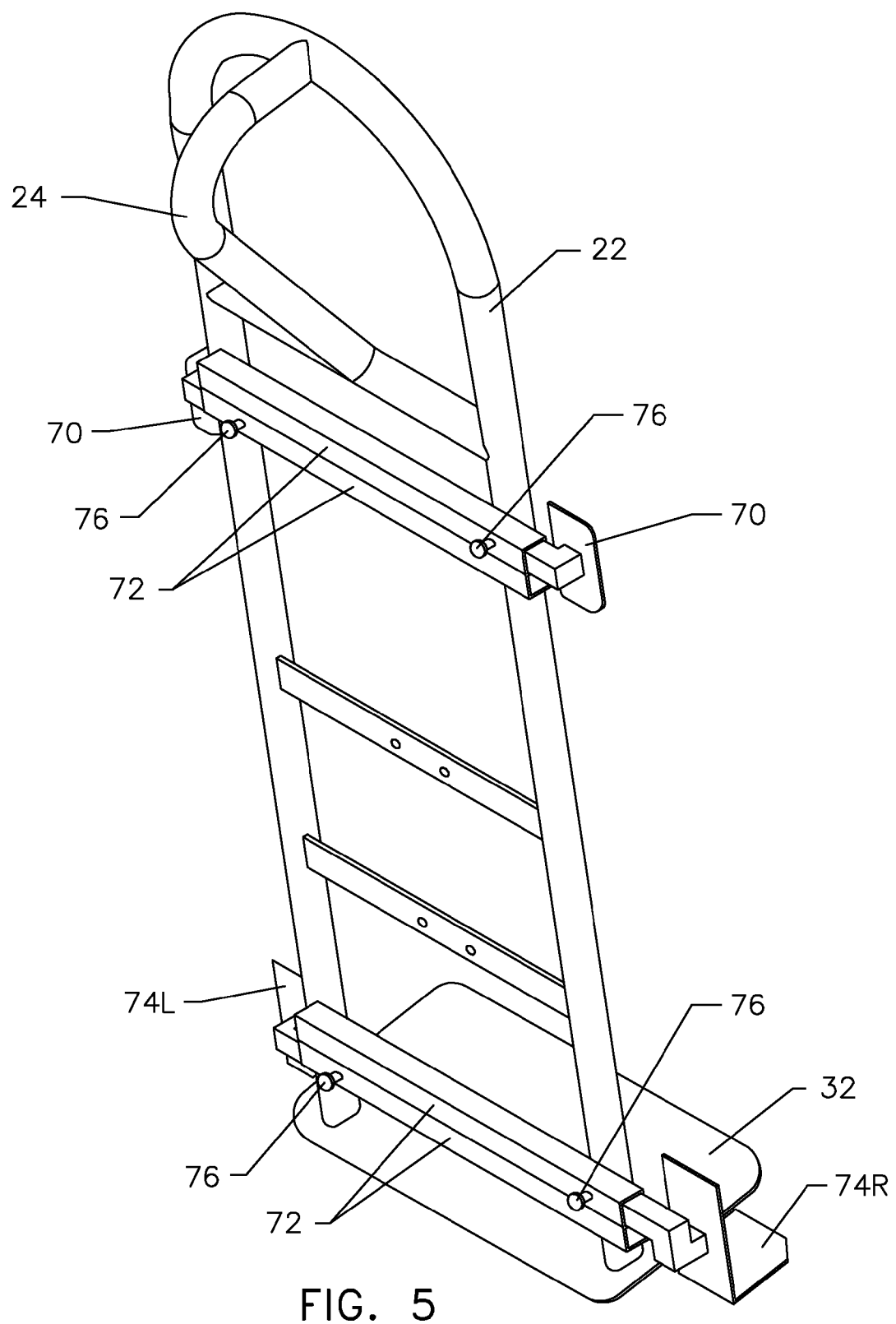
FIG. 5 is a perspective view showing the frame with optional additional load supports.

FIG. 4 illustrates a breakdown of the lock system. A lock plate 58 attached to wheel base 42 is spring loaded by a spring 68 to the latched position. A down lock pin 66 is mounted to a deflector 64. Deflector 64 is mounted to the bottom of angled mount plate 30 which is affixed to frame assembly cylinder 26. A lift arm lock pin 62 extends from lift sleeve 46 aligned with lock plate 58.

Operation

The dual directional hand truck 10 in the first mode of operation is similar to prior art conventional hand trucks. As shown in FIG. 1, wheel assembly 34 and frame assembly 20 are locked together operating as one solid unit. The second mode of operation enables this same device to haul linier loads. FIG. 4 is a close up view of how frame assembly 20 and wheel assembly 34 are locked together or released to reconfigure to the second mode of operation. By depressing (foot operated) release lever 60, wheel assembly 34 and frame assembly 20 are unlocked. With downward movement of lift arm 38, lift sleeve 46 raises frame assembly 20 following the path of guide slot 28 to a height that will clear wheels 44. At this point the horizontal portion of guide slot 28 allows wheel base cylinder 36 to rotate 90° on a vertical axis. When lift arm 38 is being used to raise the load, lift arm lock pin 62 is blocked from engaging with lock plate 58 by deflector 64. Now that frame assembly 20 and the load are supported by the horizontal portion of guide slot 28, lift arm 38 is free to move to the tow position. With frame assembly 20 and the load held in the upper position, along with deflector 64, lock plate 58 will now lock onto lift arm lock pin 62. While in this locked position, lift arm 38 functions as a tow arm to move the device and the linier load in line with the direction of travel.

Figure 3A:
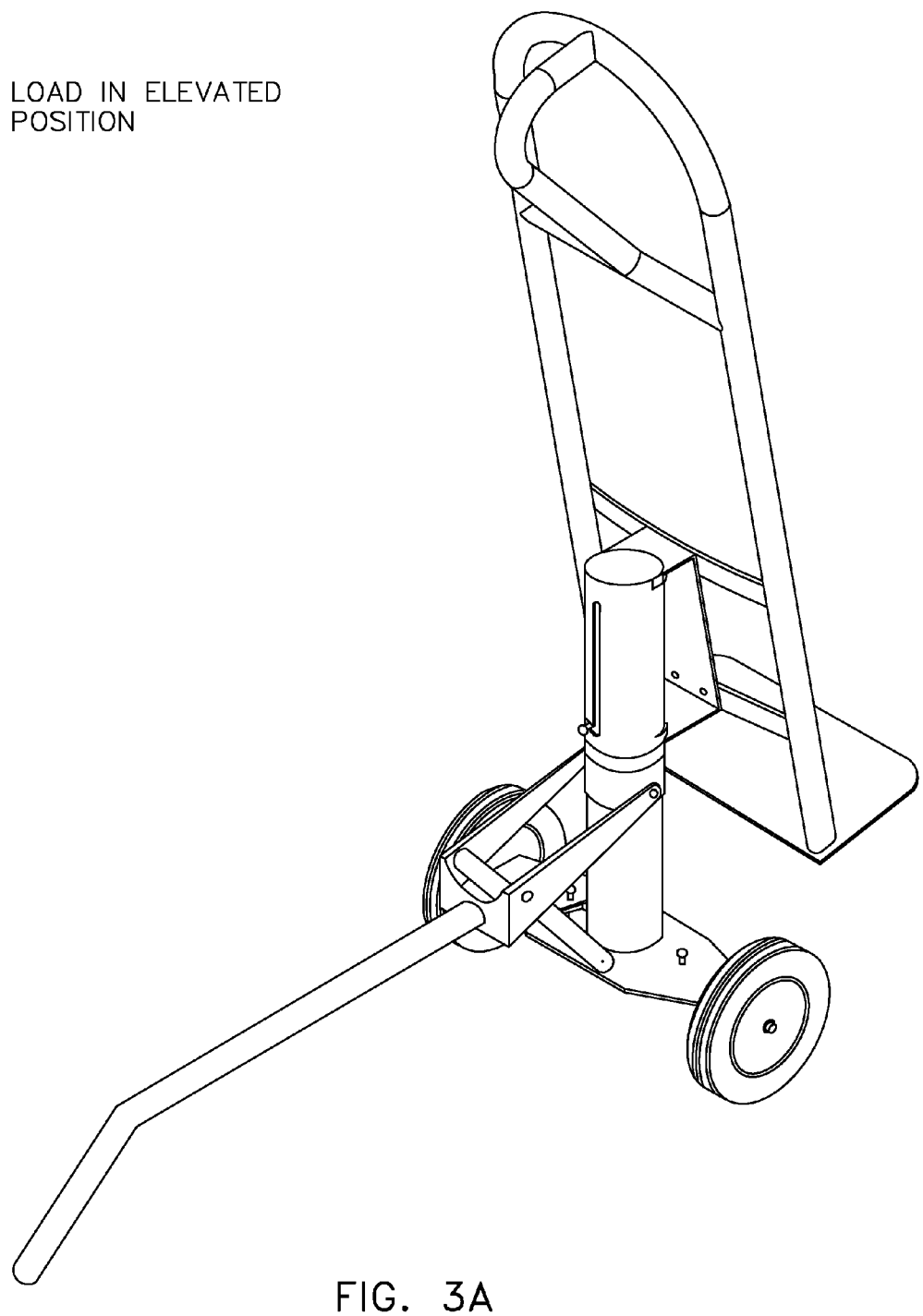
FIGS. 3A, 3B and 3C are perspective sequential views of configurations between the two assemblies of the invention of FIG. 1.
Figure 3B:
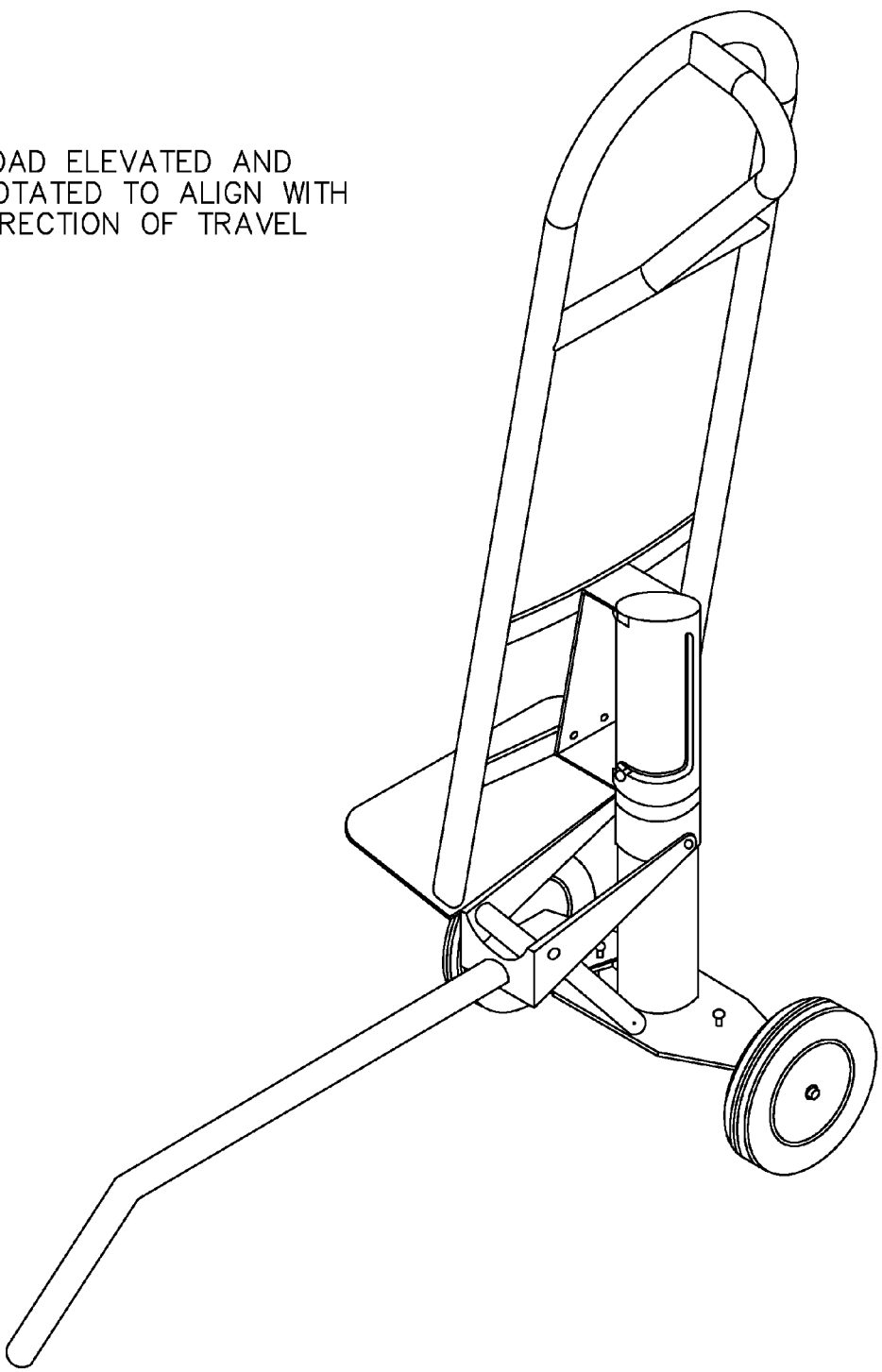
Figure 3C:
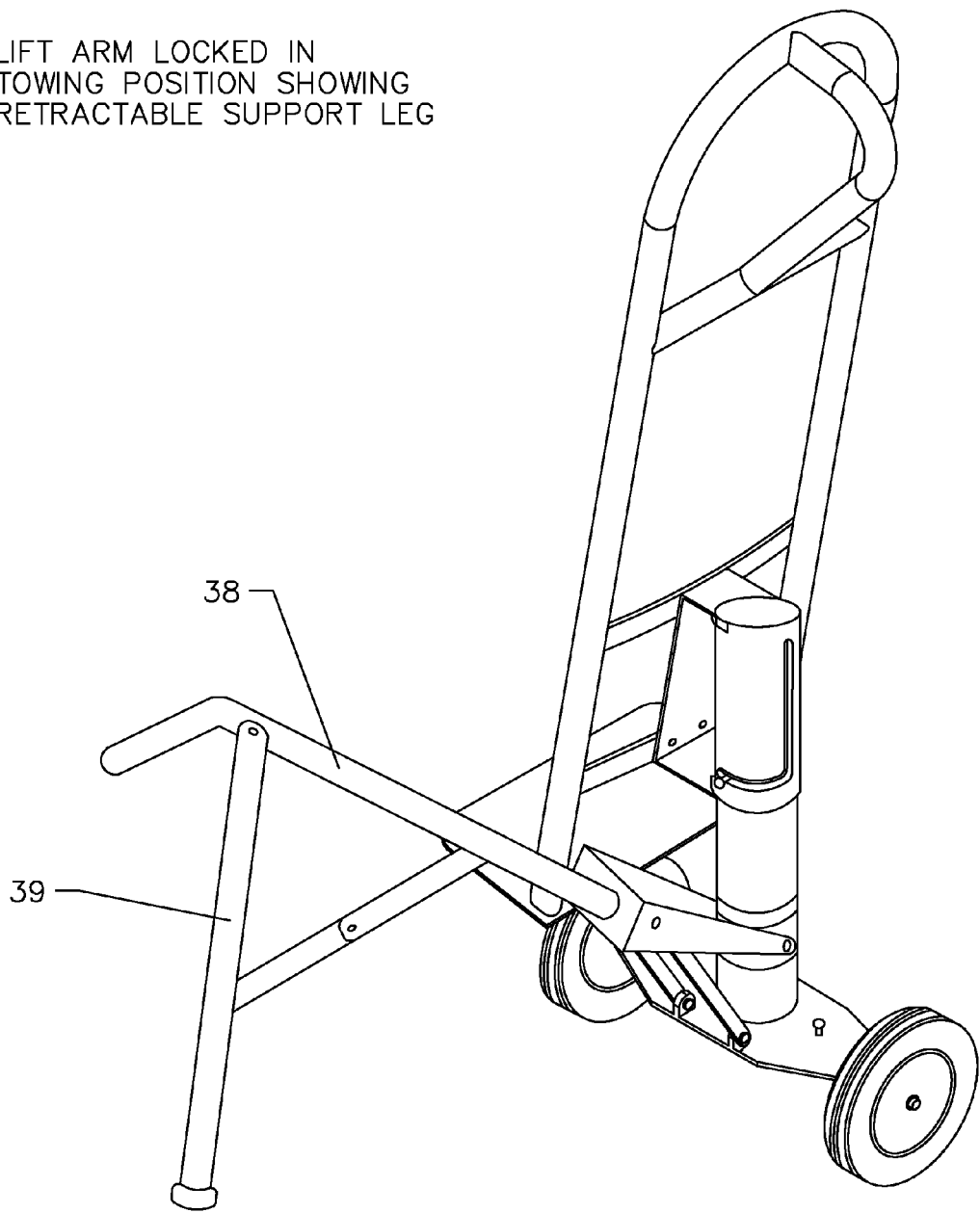

FIGS. 3A, B, and C show the sequential configurations when changing to the second mode of operation. Upon reaching the destination, if the operator chooses, the device can be reverted back to the first mode for ease of unloading.

Additional Embodiment

Figure 6:
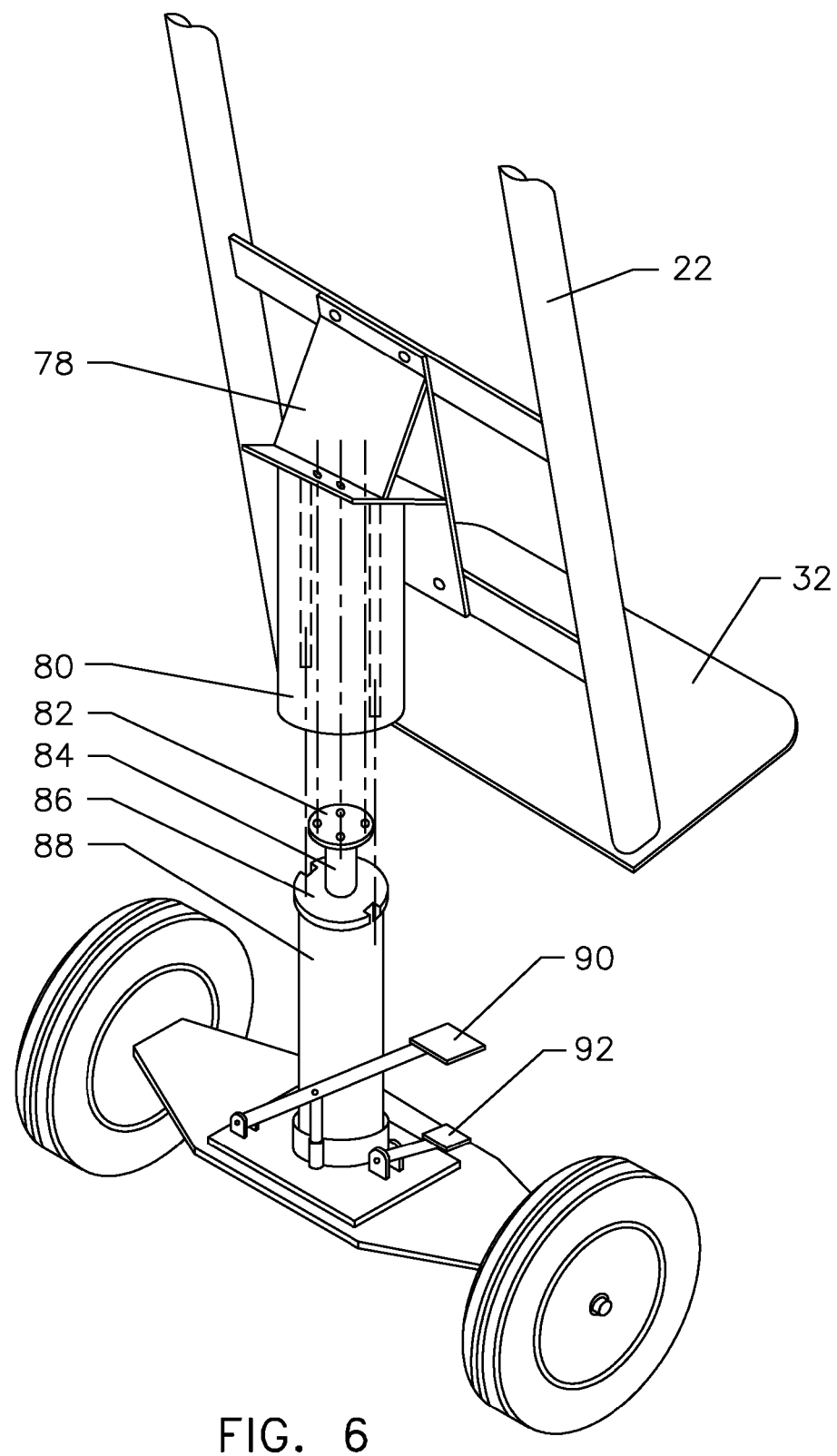
FIG. 6 is a perspective view of an additional embodiment of the present invention using hydraulic force to raise the frame assembly in relation to the wheel assembly, shown as a hydraulic jack.

An additional embodiment is shown in FIG. 6 using hydraulic force to raise the frame assembly in relation to the wheel assembly. This embodiment enables the operator to change the mode of operation by using a foot pump lever to raise the load and a foot release lever to release the jack pressure, lowering the load. The hydraulic lifting device also functions as the slidable cylinders shown in the first embodiment enabling the frame assembly to be rotated to align a linier load with the direction of travel.

ADVANTAGES

The conventional hand truck is a common and very useful tool. The present invention shows how this simple tool can be redesigned to make it even more useful. The conventional hand truck has one distinct limitation: it can only travel perpendicular to the frame and the load. From the description of the above embodiments of the dual directional hand truck, at least the following advantages become evident:

a. The frame can be raised, increasing ground clearance of the load.
b. With the frame raised, the wheel assembly can be rotated on a vertical axis allowing the direction of travel to be parallel to the frame with a linier load.
c. Economy of space: with this dual directional hand truck there is no need to buy an additional piece of equipment to move linier loads.

CONCLUSION, RAMIFICATIONS AND SCOPE

Accordingly, the very useful prior art hand truck becomes even more useful. The dual directional hand truck retains all the capabilities of the conventional hand truck. In addition, it can move linier loads, as for example, sheet material, doors, lumber or lengths metal in confined space such as through a doorway with ample ground clearance. The present invention does not require additional wheels for lateral movement.

I claim:

1. A dual directional hand truck, comprising:
a. a frame assembly having a frame assembly cylinder of a predetermined size, mounted at a predetermined angle thereunder for enabling said frame assembly to rotate on a vertical axis while in a slightly reclined, load balanced attitude;
b. a wheel assembly having a wheel assembly cylinder mounted perpendicular to the axle, said wheel assembly cylinder being sized to be a slip-fit with said frame assembly cylinder; enabling rotational and vertical movement of said frame assembly, relative to said wheel assembly on a surface;
c. a means of controlling and limiting the interactive movement of said cylinders; and
d. a means of directing force to lift said frame assembly relative to said wheel assembly on a surface.

2. The hand truck of claim 1, wherein the method of raising said frame assembly is a system of linkage and leverage, providing mechanical advantage to manually raise and lower the load relative to said wheel assembly.

3. The hand truck of claim 1, wherein the force to lift said frame assembly and load is provided by hydraulic force.

4. The hand truck of claim 1, wherein a hydraulic jack, in addition to lifting the frame assembly and load, is designed to also function as the interacting cylinders of said frame assembly and said wheel assembly.

5. The hand truck of claim 1, further including a handle connected to the wheel assembly which can be used to guide the load in the direction of travel.

6. The hand truck of claim 1, wherein base extenders extend outward from both sides of the frame assembly, when needed as additional support.

7. The hand truck of claim 1, further including extendable support arms which extend out laterally from each side of the frame assembly to thereby provide additional load support as the frame assembly is tipped back from the vertical position.

8. The hand truck of claim 1, wherein a locking device holds the two assemblies in a fixed position, and wherein said locking device can be unlocked permitting movement between the two assemblies thereby enabling lateral movement relative to the frame assembly.

* * * * *